Aug. 2, 1966  A. J. WISNIEWSKI  3,263,959
SOLENOID VALVE
Filed Dec. 23, 1964
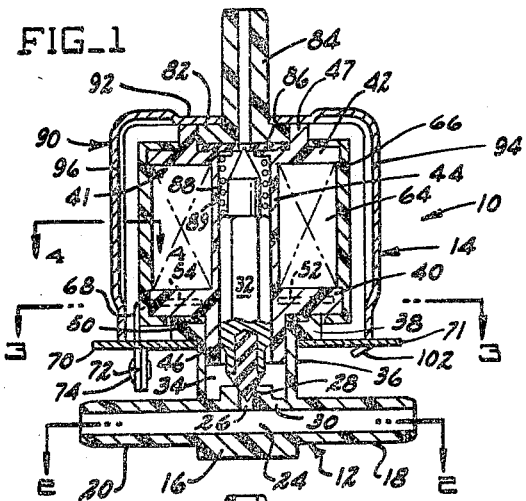
INVENTOR.
ARTHUR J. WISNIEWSKI
BY
JOHN E. McRAE
ATTORNEY

United States Patent Office 3,263,959
Patented August 2, 1966

3,263,959
SOLENOID VALVE
Arthur J. Wisniewski, Southfield, Mich., assignor to American Radiator & Standard Sanitary Corporation, New York, N.Y., a corporation of Delaware
Filed Dec. 23, 1964, Ser. No. 420,598
8 Claims. (Cl. 251—141)

This invention relates to solenoid valves, one object being to provide a solenoid valve wherein the solenoid is devoid of conventional pole pieces, thus simplifying the solenoid construction.

An additional object is to provide a solenoid valve wherein the solenoid is formed to include a one-piece dielectric spool having a tubular extension which fits within a portion of the valve body, whereby to facilitate attachment of the solenoid and valve body together.

A still further object of the invention is to provide a solenoid valve wherein a floating armature directly engages the internal surface of a dielectric spool of the solenoid, whereby to eliminate the conventional plunger guide and reduce the diameter of the solenoid.

Another object is to provide a solenoid valve wherein an armature plunger is separated from the coil winding by a relatively small radial gap, whereby to concentrate the magnetic flux in the plunger.

An additional object is to provide a solenoid valve wherein the inner diameter of the coil winding is relatively small, whereby to provide a relatively large number of turns with a comparatively short length of wire.

A further object is to provide a solenoid valve wherein the frame of the solenoid is utilized as a constructional element to clamp the solenoid onto the valve body, whereby to eliminate screws or other conventional clamping elements.

A still further object is to provide a solenoid valve wherein all of the component parts are locked together solely through crimped tabs formed as parts of the solenoid frame, whereby to permit assembly of the valve in a single step operation.

Another object is to provide a solenoid valve wherein a series of hollow tubular conduits are formed integrally with the valve body, certain ones of said conduits being in unrestricted communication with a common valve body chamber whereby to permit a series of valves to be operatively connected together with their common chambers connected to a central fluid source or device, thereby permitting the common chambers of the various valves to act as a low cost manifold even though the various valves be located remote from one another.

An additional object is to provide a solenoid valve wherein the solenoid is provided with a ground terminal which mates with a portion of the mounting bracket for the valve when the solenoid and bracket are connected together.

Another object is to provide a solenoid valve wherein a portion of the solenoid frame is adapted to form a supporting surface for a valve seat constituting part of the valve.

Another object is to provide a solenoid valve wherein various different valve bodies can be utilized with a single solenoid construction, whereby to permit manufacture of a line of normally open and normally closed valves with minimum parts duplication.

Other objects of this invention will appear from the following description and appended claims, reference being had to the accompanying drawings forming a part of this specification wherein like reference characters designate corresponding parts in the several views.

In the drawings:
FIGURE 1 is a sectional view taken through a solenoid valve embodying the invention;
FIG. 2 is a sectional view taken on line 2—2 in FIG. 1;
FIG. 3 is a sectional view taken on line 3—3 in FIG. 1;
FIG. 4 is a sectional view taken on line 4—4 in FIG. 1;
FIG. 5 is a fragmentary sectional view taken through a portion of another solenoid valve embodying the invention;
FIG. 6 is a sectional view taken through a further embodiment of the invention; and
FIG. 7 is a sectional view taken on line 7—7 in FIG. 6;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in FIG. 1 the invention is embodied in a solenoid valve 10 which comprises a molded nylon plastic valve body 12 and a solenoid 14. Molded body 12 comprises a central portion 16 integrally connected with a first tubular conduit 18, a second tubular conduit 20, and a third tubular conduit 22. Tubular conduits 18 and 20 enjoy unrestricted communication with a central passage or chamber 24 which communicates with an upwardly extending passage 26 leading to a valve seat 28 formed by a partition 30.

Cooperating with seat 28 is a valve element in the form of an armature plunger 32. In its illustrated lowered position plunger 32 engages seat 28 to isolate chamber 24 from the upper chamber 34 formed within the upstanding sleeve portion 36 of the valve body. As shown in FIG. 2, chamber 34 communicates with a tubular conduit 22. Therefore, when plunger 32 is raised from its illustrated position conduit 22 communicates with conduits 18 and 20. The conduits are adapted to have flexible tubings fitted thereover to connect the valve with other devices such as valves, pumps, vacuum-actuated switches, pressure-actuated switches or other components forming parts of a fluid system.

Sleeve portion 36 of the valve body is radially enlarged at its upper end to provide a flange 38, the upper face of which is arranged to abut against the end wall or flange 40 of a dielectric spool 41 constituting part of solenoid 14. The dielectric spool is preferably a single nylon molding comprising a hollow tubular portion 44, the aforementioned end wall 40, a second end wall or flange 42, a downwardly projecting tubular extension 46, and an upwardly projecting annular wall 47 which may be considered as part of wall 42. The spool is arranged on valve body 12 with its tubular extension 46 snugly fitting within valve body sleeve portion 36 and with its wall 40 engaging the upper face of valve body flange 38; a compressible sealing gasket 50 may be provided in a recess in flange 38 to seal chamber 34 from the atmosphere. The spool and valve body are readily molded to close tolerances, and the snug fit of extension 46 in sleeve portion 36 therefore precisely aligns the plunger 32 with seat 28. This is quite important, particularly with small diameter seats and valves tolerating no leakage.

It will be noted that spool wall 40 has a greater axial thickness than spool wall 42. Wall 40 can thus be provided with two slots which receive portions 52 and 54 of spade terminals 56 and 58. Each terminal is provided with a relatively thin elongated leg 60 or 62 which is adapted to have an end portion of the electric winding 64 wrapped therearound. Thus the inner end of the winding can be extended around leg 62, the outer end of the winding can be extended around leg 60, after which solder is applied to electrically connect the windings with the respective terminals.

After the winding has thus been connected with the terminal the spool-winding-terminal assembly is positioned within a conventional injection or vacuum-molding apparatus to provide a molded encapsulating coating 66. The spool material is preferably nylon because of advantageous properties in wear, lubricity and ability to hold to small dimensional tolerances; the encapsulating material is preferably epoxy because of its low cost and non-porous character. The complete encapsulated coil forms a unitary sealed construction in which terminals 56 and 58 are locked in place by the encapsulation.

It will be noted from FIG. 1, that terminal 58 is provided with a downwardly extending ear portion 68 which extends past plate portion 70 of a metallic valve mounting bracket 71. The plate portion is equipped with a tab 72 which is stuck downwardly out of its plane to mate with the lower end area of the downwardly extending terminal portion 68. The mated portions are then firmly secured together by a rivet 74 or other securement means such as a screw or soldering. When soldering is employed the two portions 72 and 68 are preferably bent over into the lower face of plate portion 70 to insure good physical contact in spite of tolerances in the tab-terminal members. Terminal 56 is connected with a source of positive voltage such as the battery in an automotive vehicle, and terminal 58 acts as a grounding terminal. The grounding function of terminal 58 is facilitated by the fact that the terminal is connected with the metallic bracket 71. The bracket is provided with a downwardly extending portion 76 (FIG. 3) which is provided with a pair of mounting holes 78 for securing the bracket and associated valve assembly on a portion of a vehicle frame. Installation of bracket 71 onto the valve body is facilitated by the fact that plate portion 70 has a concavity defined by surface 73, whereby to enable the bracket to be slipped onto valve body portion 36 with a lateral motion.

As shown in FIG. 1, annular upstanding portion 47 of spool 41 defines a cavity for reception of a resilient compressible gasket 86 and the flange portion 82 of a molded plastic tubular conduit 84. The central opening in gasket 86 constitutes a valve seat for cooperation with the upper conical end portion of armature plunger 32. As shown in FIG. 1 the armature is in a lowered position in which the upper valve seat is open and the lower valve seat 28 is closed. Armature 32 is of hexagonal cross section, while the hollow tubular portion 44 of spool 41 is of circular cross section so that upper chamber 88 communicates with lower chamber 34 through the segmental spaces between the armature and spool surface.

To provide a return path for the magnetic flux generated in armature 32 there is utilized a magnetically permeable frame 90 which includes an upper wall or web 92 and a pair of downwardly extending walls 94 and 96. As is shown in FIG. 4 the walls may be reinforced by a central rib 98. Bracket 71 is preferably formed of magnetically permeable material to cooperate with frame 90 in returning the flux to armature 32.

Wall 94 is provided with two spaced tabs 100 and 102 which extend through openings in plate 70 and which are then crimped inwardly to lock wall 94 and plate 70 together. Similarly, wall 96 is provided with a tab 104 (FIG. 3) which extends through an opening in wall 70 and is then crimped thereon to lock walls 96 and 70 together. The crimping action on tabs 100, 102 and 104 serves as the sole means for locking the various valve components together. The crimping operation applied to the tabs draws the component parts together and applies a compressive force on the sealing elements 50 and 86, whereby the chambers 88 and 34 are sealed from the atmosphere. The axial tolerance on wall 47 determines the compressive action on element 86.

The FIG. 1 valve is particularly designed for use on automotive vehicles to control the application of vacuum on certain vacuum-operated devices such as vacuum switches. As the valve is thus used, tubular conduit 84 may be connected with a vacuum pump, tubular conduit 18 may be connected with atmosphere, valve 20 may be connected with a valve similar to the FIG. 1 valve, and tubular conduit 22 may be connected with the vacuum switch or other device to be controlled. In the illustrated position of plunger 32 the pump vacuum is applied to conduit 84, chamber 34, conduit 22, and the device to be controlled. Energization of solenoid winding 64 causes armature plunger 32 to be drawn upwardly against the biasing action of spring 89, whereby conduit 22 communicates with conduits 18 and 20, to vent the controlled device to the atmosphere. Other valves connected to conduit 20 may also be vented through the manifold provided by chamber 24 and conduit 18.

The valve shown fragmentarily in FIG. 5 is similar to the FIG. 1 valve except that frame 90 is not reinforced with a rib and tubular conduit 84 is omitted. In the FIG. 5 valve the central portion of magnetic frame wall 92 is dished downwardly at 98 to compress gasket 86. As shown, the downwardly dished portion is formed with an opening 100 which forms a vent for chamber 88.

The FIG. 5 valve may be utilized in a vacuum system wherein conduit 18 is connected with a vacuum pump, conduit 20 is connected with a valve similar to the FIG. 5 valve, conduit 22 is connected with a device to be controlled, and vent opening 100 connected with the atmosphere. In the lowered position of armature 32 the controlled device is vented through conduit 22 and vent opening 100. In the raised position of armature 32 the controlled device is connected with the vacuum pump by means of the conduit 22, chamber 34, passage 24 and conduit 18.

The valve of FIG. 6 utilizes a valve body wherein conduit 22 enjoys unrestricted communication with conduit 18, and conduit 20 communicates with the first-mentioned conduits via a valve seat 28. The upper portion of the FIG. 6 valve is similar to the upper portion of the FIG. 5 valve except that dished portion 98 of the magnetic frame is closed.

In use of the FIG. 6 valve conduit 18 may be connected with a vacuum pump, conduit 22 may be connected with another FIG. 6 valve, and conduit 20 may be connected with a device to be controlled. In the lowered position of armature 32 the pump vacuum is isolated from the controlled device, and in the raised position of the plunger the pump vacuum is communicated to the controlled device via the conduit 20.

The description has proceeded on the basis that the valves are useful in vacuum systems. It is contemplated however that the valves can be utilized in pressure systems using air, other gas, or liquids as the fluid medium. The valves may be constructed in various sizes and flow capacities. However, the invention is particularly useful when the valve is made in relatively small sizes wherein the solenoid coil has a major diameter of something on the order of ¾ inch. The molded nature of the valve body and the solenoid coil 41 particularly lend the valve to manufacture in such small sizes.

One feature of importance is the fact that armature plunger 32 directly engages the internal surface of spool portion 44. This arrangement is unusual and is advantageous in that it eliminates the metallic plunger guide sleeve which is usually employed in these types of solenoid valves. By eliminating the conventional plunger guide I not only eliminate its cost but also reduce the major diameter of tubular portion 44. The electric winding is therefore wound on a relatively small diameter spool surface so that a relatively short length of wire can be utilized to form an increased number of turns.

The small radial spacing between armature 32 and the electric winding is advantageous in that it concentrates the magnetic flux flowing through the armature and provides a somewhat straighter axial flux path than would otherwise be possible. Return flux is accommodated in the magnetic frame 90 and plate portion 70, so that in practice there is no need for the tubular pole pieces which are conventionally employed in floating armature solenoid valves. As previously noted, the spool is preferably nylon which has characteristics of long wear and low co-efficient of friction. The use of a nylon spool is thus advantageous in alleviating armature sticking and in reducing the power requirements for the solenoid.

What is claimed:

1. A solenoid valve comprising a valve body having a flange defining two oppositely facing surfaces; a solenoid including a dielectric spool having a hollow tubular portion and two outwardly radiating end walls, one of said end walls seating on one of the aforementioned flange surfaces; a mounting bracket for the valve including a magnetically permeable plate engaging the other flange surface; a magnetically permeable frame for the solenoid including a web portion engaging the other spool end wall and two wall portions extending from opposite extremities of said web portion into interlocking connections with the aforementioned plate whereby to draw the spool tightly against the valve body and lock the valve body to the mounting bracket.

2. The combination of claim 1 wherein the interlocking connections are formed by tabs on the wall portions and openings in the plate, said tabs extending through the openings and being crimped against the plate.

3. A solenoid valve comprising a one piece valve body which includes an externally flanged hollow central portion defining a pair of chambers and a valve seat therebetween, and three outwardly radiating tubular conduits connected with said central portion, two of said hollow tubular conduits having unrestricted fluid communication with one of the chambers, and the other tubular conduit having unrestricted communication with the other chamber; said tubular conduits occupying planes normal to the axis of the hollow central portion a solenoid coil positioned on the exterior flange of said valve body; a solenoid armature disposed within the coil and registering with said seat for controlling flow between the two chambers and magnetically permeable field means for the coil comprising a flat plate and a U-shaped frame having a web portion and end walls; said plate and the frame web portion being disposed parallel to one another at right angles to the armature axis and operatively sandwiching the valve body flange and coil therebetween; the frame end walls having interlocking connections with the plate to draw the coil tightly against the valve body flange.

4. A solenoid valve comprising a valve body; a mounting bracket including a plate engaging said valve body; a solenoid coil for the valve body including a dielectric spool which comprises a hollow tubular portion and a pair of outwardly radiating end walls; an electric winding trained around the tubular portion; one of said spool end walls having a pair of slots therein; a first spade terminal positioned in one of said slots and connected with one end of the electric winding; a second spade terminal positioned in the other slot and connected with the other end of the electric winding; said second terminal having a portion directed angularly into engagement with the aforementioned mounting plate, whereby the mounting bracket acts as a ground for the coil; and di-electric encapsulating material surrounding the winding and locking the terminals in their slots.

5. A solenoid valve comprising a valve body having a hollow central portion which defines an upstanding sleeve and a radial flange, a partition within said hollow portion defining a pair of chambers and a valve seat therebetween, three outwardly extending tubular conduits connected with said central portion, two of said conduits having unrestricted fluid communication with one of the chambers, and the other conduit having unrestricted communication with the other chamber; a mounting bracket for the valve including a magnetically permeable plate engaging the underface of the aforementioned radial flange; a solenoid coil including a dielectric spool having a hollow tubular portion, two outwardly radiating end walls and an annular extension projecting beyond one of the end walls; said one end wall seating on the upper surface of the aforementioned flange, and said annular extension having a telescopic connection with the aforementioned hollow central portion; an electric winding trained around the spool tubular portion; said one spool end wall having a pair of slots therein; a first spade terminal positioned in one of said slots and connected with one end of the electric winding; a second spade terminal positioned in the other slot and connected with the other end of the electric winding; said second terminal having a portion thereof directed into engagement with the aforementioned mounting bracket, whereby said bracket acts as a ground for the coil; dielectric encapsulating material surrounding the winding and locking the terminals in their slots; a magnetic frame for the solenoid including a web portion engaging the other end wall of the spool and two wall portions extending from opposite extremities of said web portion through openings in the aforementioned plate, the wall portions which extend through said openings being formed as tabs which are crimped against the plate to draw the spool tightly against the valve body, thereby locking the valve body to the mounting bracket.

6. A solenoid valve comprising a valve body having an interior valve seat, and a surrounding externally flanged sleeve; a one piece dielectric spool having a hollow tubular portion, a pair of end walls, and an annular wall extending from one of the end walls to form a cavity; an electric winding trained around said tubular portion; said spool having its other end wall seated directly against the valve body sleeve; an armature plunger slidably disposed within the spool tubular portion for movement toward the valve seat; a deformable gasket positioned in the aforementioned cavity; and a magnetic field means for capturing flux from the armature including a frame structure defined by two interlocking wall members, one of which engages the aforementioned annular wall and the other of which engages the underside of the sleeve flange, said interlocking wall members being operable to draw the coil tightly against the valve body sleeve and to apply a controlled compressive action on the gasket.

7. The combination of claim 6 and further comprising a tubular conduit having a radial flange seated in the aforementioned cavity between the frame wall and gasket.

8. A solenoid valve comprising a valve body having an interior valve seat and an exterior radial flange; a mounting bracket for the valve body comprising a magnetically permeable plate having a concavity in one of its edges conforming to the exterior contour of the valve body whereby the plate is caused to underlie the radial flange with its concavity partially surrounding the valve body; a solenoid including a dielectric spool having a hollow tubular portion and two outwardly radiating end walls, one of said end walls seating on the face of the radial flange remote from the magnetically permeable plate; a magnetically permeable frame structure for the solenoid including the aforementioned plate and a U-shaped magnetically permeable frame; said frame including a web portion engaging the other spool end wall and two wall portions extending from opposite extremities of said web portion into interlocking connections with the aforementioned plate whereby to draw the spool tightly against the valve body and lock the valve body to the mounting bracket; and a slideable plunger armature directly engaging the inner surface of the hollow tubular spool portion for movement toward and away from the valve seat.

References Cited by the Examiner
UNITED STATES PATENTS

| | | | |
|---|---|---|---|
| 2,223,986 | 12/1940 | Eaton | 251—129 |
| 2,449,438 | 9/1948 | Wisegarver | 317—191 |
| 3,080,889 | 3/1963 | Noakes | 137—625.65 |

References Cited by the Applicant
UNITED STATES PATENTS

| | | |
|---|---|---|
| 2,139,919 | 12/1948 | Wakins. |
| 2,982,304 | 5/1958 | Bauerlein. |
| 3,045,290 | 7/1962 | Anderson. |
| 3,036,246 | 5/1962 | Valleau. |

M. CARY NELSON, *Primary Examiner.*

MARTIN P. SCHWADRON, *Examiner.*

A. ROSENTHAL, *Assistant Examiner.*